United States Patent [19]

Roe

[11] Patent Number: 5,224,211

[45] Date of Patent: Jun. 29, 1993

[54] METHOD AND APPARATUS FOR NON-CONTACT EXTRACTION OF ON-BOARD VEHICLE TRIP RECORDERS

[75] Inventor: Mark A. Roe, Clawson, Mich.

[73] Assignee: Rockwell International Corporation, Pittsburgh, Pa.

[21] Appl. No.: 508,378

[22] Filed: Apr. 12, 1990

[51] Int. Cl.$^5$ .......................... G06F 3/00; G06F 13/00
[52] U.S. Cl. ..................................... 395/200; 395/325; 364/424.04; 364/927.99; 364/DIG. 2
[58] Field of Search ......................................... 395/200

[56] References Cited

U.S. PATENT DOCUMENTS

| | | | |
|---|---|---|---|
| 4,903,338 | 2/1990 | Funke | 455/607 |
| 4,926,481 | 5/1990 | Collins, Jr. | 380/25 |
| 4,939,652 | 7/1990 | Steiner | 340/438 |

Primary Examiner—Gareth D. Shaw
Assistant Examiner—John Q. Chavis

[57] ABSTRACT

The present invention includes an optical interface accomplished by physically securing mating male and female portions of extractor/extractee members so as to accomplish alignment of respectively interacting infrared light emitting diodes with photo diodes. A total of four transmit and receive pairs are used. Two pairs are used for friend-foe recognition. A second pair transmit and receive data collected by the trip recorder to the host computer (and visa versa). The physical secureness of the mating male and female portions of extractor/extractee modules includes a mechanical fuse (in the form of a breakable tab) which is provided to fail structurally in the event of forces resulting from the vehicle leaving the extraction area with the extractor and extractee still connected.

4 Claims, 12 Drawing Sheets

METHOD AND APPARATUS FOR NON-CONTACT EXTRACTION OF ON-BOARD VEHICLE TRIP RECORDERS

BACKGROUND OF THE INVENTION

The field of the invention is on-board vehicle trip recording systems, and more particularly, apparatus for extracting data recorded by an on-board trip recorder to a host computer for subsequent analysis.

DESCRIPTION OF THE PRIOR ART

Vehicle data recording systems are commonly known and used in the art for collecting and recording a predetermined set of vehicle parameters during vehicle operation. Vehicle trip recording systems are commonly used on commercial vehicles to collect data regarding operation of the vehicle which may later be analyzed to determine patterns of vehicle operation and other maintenance information. The vehicle data is recorded throughout the course of a trip, or other predetermined periods of operation. Upon completion of the period of operation the data may be extracted for analysis.

In one prior method for extracting the vehicle data from the trip recorder, an electrical receptacle is provided on the vehicle which is connected to the trip recorder via appropriate cabling. When the vehicle data is to be extracted from the trip recorder, the vehicle pulls into an extraction station. At the extraction station, a cable is provided terminating on one end in a plug which mates with the receptacle on the vehicle or the trip recorder itself. The other end of the cable connects physically to the host computer. Once the plug is inserted into the receptacle, a hard wire connection is established between the trip recorder and the host computer. The host computer may then communicate directly with the trip recorder, issuing an appropriate set of commands to cause the trip recorder to transmit data to the host computer.

A second prior method known for extracting vehicle data is the use of a portable magnetic storage device, i.e., a tape recorder. The portable magnetic storage device suitable for this operation includes a cable and a mating plug for connection to the trip recorder. Since the portable magnetic storage device is small and light, it can be carried directly to the vehicle. Once connected to the trip recorder, the portable magnetic storage device performs the same extraction of the vehicle data as before, yet storing the data on a magnetic media. The magnetic media then is carried to the processing facility where it is input on the host computer for analysis.

It can be seen from the above discussion that each of the above described methods has its own advantages and disadvantages. Both the magnetic media and hard wire extraction technique require interconnection of a plug and a receptacle to extract data. Over time, wear of the respective connections causes signal transmission errors. In addition, in the case of a hard wire connection, if the plug and receptacle are not disconnected before the vehicle is moved, substantial damage can result to the trip recorder as well as the host computer.

SUMMARY OF INVENTION

The present invention includes an optical interface for interconnecting the recorder data port of an on-board trip recorder to the host data port of a host computer. The interface includes a full duplex data path providing for bidirectional exchange of data between the recorder data port and the host data port. Optical couplings including transmit and receive pairs are located on physically couplable extractor and extractee members in a predefined geometric relationship. The optical couplings include transmit/receive devices associated in pairs for communication of data in respective directions. The interface further includes a friend/foe identification device which functions by transmitting a fixed frequency continuous wave (CW) quaere signal from the extractor across an optical coupling to the extractee and transmitting a related (or identical) fixed frequency continuous wave (CW) echoed signal from the extractee across an optical coupling to an extractor. The friend/foe identification device further includes a first analog circuit incorporating a band pass filter for discriminating the quaere signal and instructing the trip recorder that data communication may be enabled (i.e., acknowledging the presence of a condition in which data communication is possible). That is; once a continuous wave signal is received, an interrupt trip recorder signal is produced and communicated to the trip recorder to suspend its recording function in preparation for data extraction. A second analog circuit incorporating a band pass filter for discriminating the ECHOED signal and instructing the host computer that data communication may be enabled. Four optical coupling transmit/receive pairs are utilized to communicate across the interface. Two are used for friend/foe identification and two are used for full duplex data exchange. The pairs are respectively arranged geometrically to provide proper alignment. That is; the friend/foe pairs provide a first geometric alignment which insures alignment of the full duplex pairs. Once the friend/foe quaere has been completed, a start command may be communicated from the host data port to a logic gate circuit. Upon the conjunctive condition of a start command and discrimination of the echoed signal, the logic gate circuit will provide a signal selectively enabling communication of recorded vehicle trip data stored in the trip recorder (along the other path of the full duplex data path). Upon any interruption of discrimination of the echoed signal; for example, accidental premature disassociation of the extractor and extractee, the logic circuit gate will disable communication of data.

The extractor is connected to the host computer data port and the extractee is connected to the trip recorder data port. The extractor and extractee nestably interfit with one another and thereby establish the respective alignment of the optical couplings. The extractor and extractee incorporate a breakaway tab member which provides a mechanical fuse between the respective members in the event of failure to disassociate the members from the nestably interfitted relationship before moving the vehicle.

These and other aspects of the present invention will become more readily apparent by reference to the following detailed description of the embodiments as shown in the drawings.

DETAILED DESCRIPTION OF THE INVENTION

Figure 1:
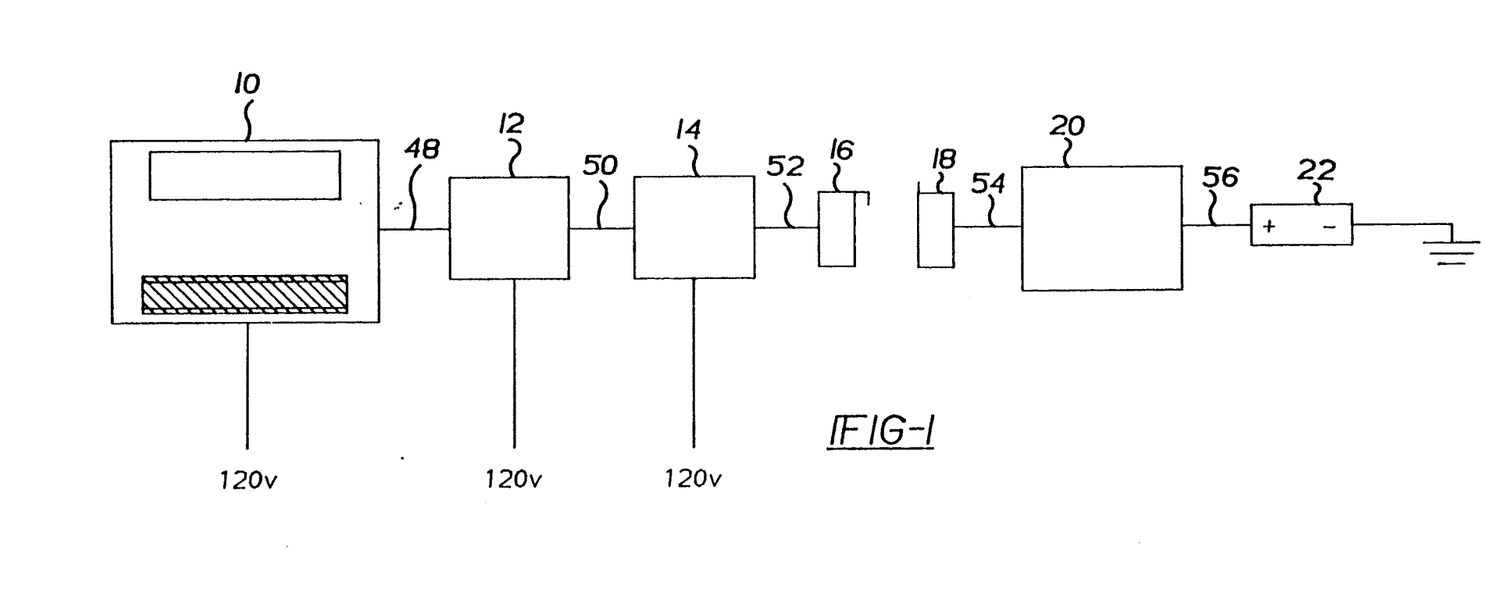
FIG. 1 is a flow diagram representation of a system which incorporates, the present invention.

Referring now to the drawings; and more particularly to FIG. 1, there is shown a schematic representation of the preferred embodiment of the present invention including a host computer 10 having a data port which is serially connected to communication link 12, data extract module 14 and finally infrared extractor 16. Infrared extractor 16 is optically coupled to infrared extractee 18 which is then serially connected to a data port associated with an on-board data recorder (hereinafter trip recorder) 20 which is powered by vehicle battery 22.

Elements of the preferred embodiment of the system of the present invention which may be purchased and therefore shall not be described in detail (with the exception of their respective interrelationship with inventive aspects of the present invention) include;

| | |
|---|---|
| Host computer | any IBM compatible PC with a minimu of 640K Ram, 10 meg hard disk and an ASYNC card |
| Host computer software | Trip Fax software; a trademarked product sold by Rockwell International Corporation |
| "Com-Link" | a tradename used for a COMMUNICATION LINK sold by Rockwell International Corporation |
| Direct Extract Module | a tradename of a product sold by Rockwell International Corporation |
| Tripmaster | a trademarked product sold by Rockwell International Corporation |

Interconnection of the aforementioned elements of the system is accomplished by connecting a 6 conductor ground shielded cable 48 to the data port of host computer 10. Cable 48 is then connected to communication link 12. Model 25 "D" type connectors and respective receptacles may be used to complete the connections. Communication link 12 power is provided by connection to a 120 volt power supply as shown. In practice, the data extract module 14 may be located as much as 2000 feet from the communication link 12. The interconnecting cable 50 is preferably a 10 conductor ground shielded cable. A 10 pin ¼ turn twist-lock connector is preferably used to connect to the communication link 12 and a 10 position screw terminal block is provided for connection in the data extract module 14. Data extract module 14 power is provided by connection to a 120 volt power supply as shown. Cable 52 is a 10 conductor ground shielded cable for connecting the data extract module 14 to the extractor 16. Cable 52 is preferably about 75 feet long to permit a broad coverage area thereby not narrowly restricting the parking location for vehicles from which data is to be extracted.

The extractor 16 is optically coupled to extractee 18 which is physically secured to the vehicle. Cable 54 is a 6 conductor ground shielded cable connecting the extractee 18 to the trip recorder 20. Cable 54 is preferably connected to the extractee 18 by a 7 pin friction lock connector. A 10 pin ¼ turn twist lock connector is utilized to connect cable 54 to the trip recorder. Trip recorder 20 power is provided by connection 56 to the vehicle battery as shown.

Figures 2, 3, 4:
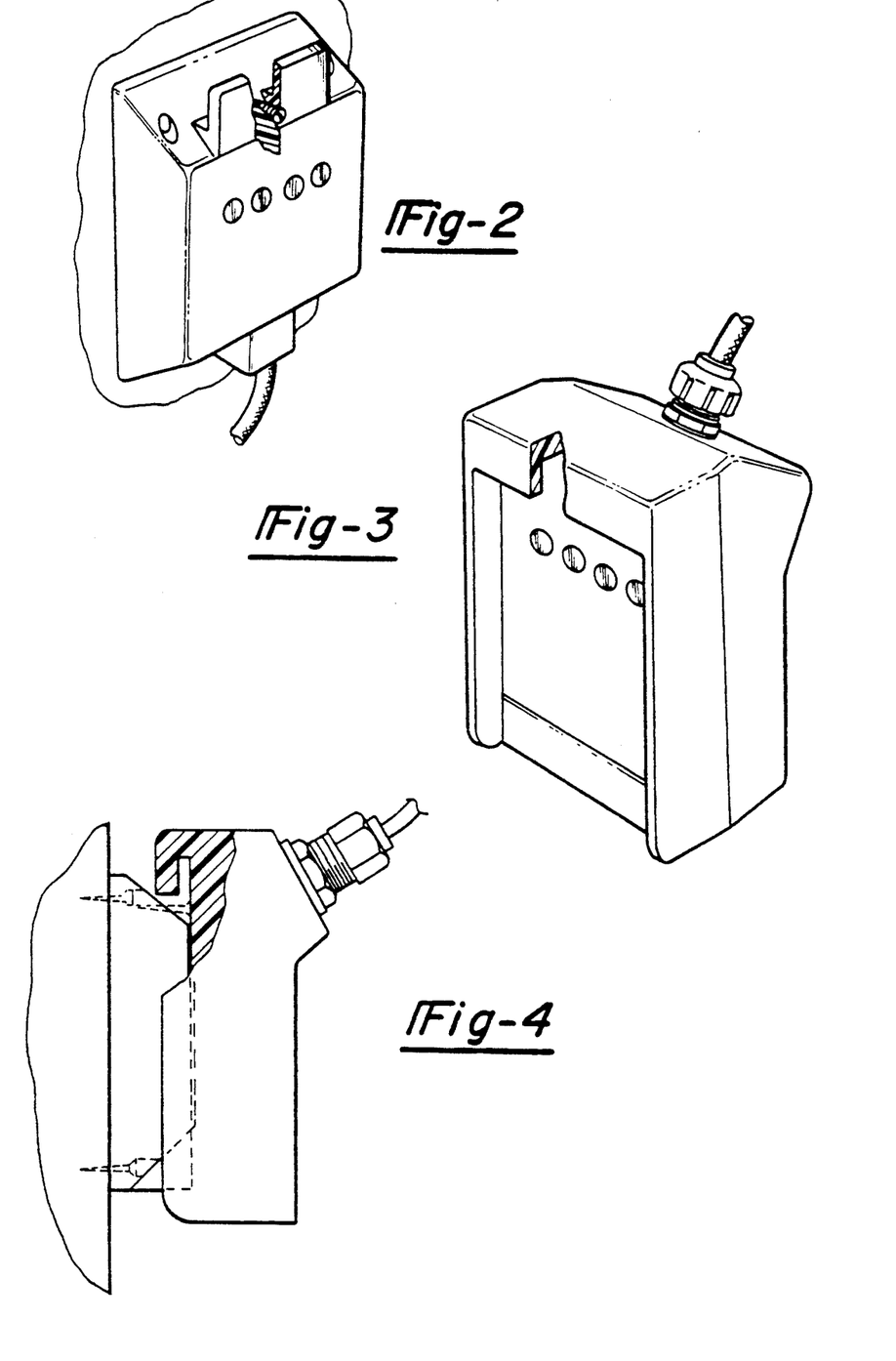
FIG. 2 is a side view of the extractee module.
FIG. 3 is a side view of the extractor module.
FIG. 4 is a cross sectional view of the extractor module placed in mating relation to the extractee module.

Extractor 16 and extractee 18 are optically coupled when detachably secured in respective engagement to one another by mating respective male and female portions as illustrated in FIG. 4. Tab 24 presents a protruding element which may be engaged with pocket 26. Extractor 16 includes a main body portion 30 which includes an aperture (not shown) for access of electrical cable 52. Pocket 26 forms a receptacle for tab 24. A pair of sidewalls 36, 36 (as shown in FIG. 3) extend continuously therefrom to skirt the pocket portion 26. Extractee 18 includes a main body 38 which features an aperture (not shown) for access of electrical cable 54. Tab 24 disposed thereon is suitable for engagement with pocket 26. Side profile portions 44, 44 (as shown in FIG. 2) cooperatively engage sidewalls 36, 36 to achieve respective alignment of extractor 16 and extractee 18. Tab 24 is secured to body 38 by removable fastener 46. In the event a driver fails to disconnect the extractor 16 from the extractor 18 after completion of data extraction, and the driver pulls away from the data extraction area, the extractor 16 will separate from the extractee 18 as a result of tension in cable 52 which imparts a shearing force causing tab 24 to structurally fail. Tab 24 may be replaced as a simple maintenance operation.

Both the extractor 16 and extractee 18 have respectively interacting infrared light emitting diodes and photo diodes (shown generally at 100 in FIGS. 2 and 3) which function to communicate logic signals thereacross in the form of infrared light signals. A total of four transmit and receive pairs are used. Two are used for friend-foe recognition; and, two are used for data communication between the host computer and trip recorder (and vice versa).

The friend-foe recognition is accomplished (as shown in schematic form in FIG. 5) by continuously generating and broadcasting a fixed frequency infrared light signal from TRANSMITTER II and receiving the same signal at RECEIVER II. If Security V discriminates the originally broadcasted signal, from all signals incident upon RECEIVER II, Security V will generate a logic signal acknowledging receipt of a friendly signal which is communicated to the trip recorder thereby terminating any other trip recorder functions and placing the trip recorder in extraction ready mode.

Figure 5:
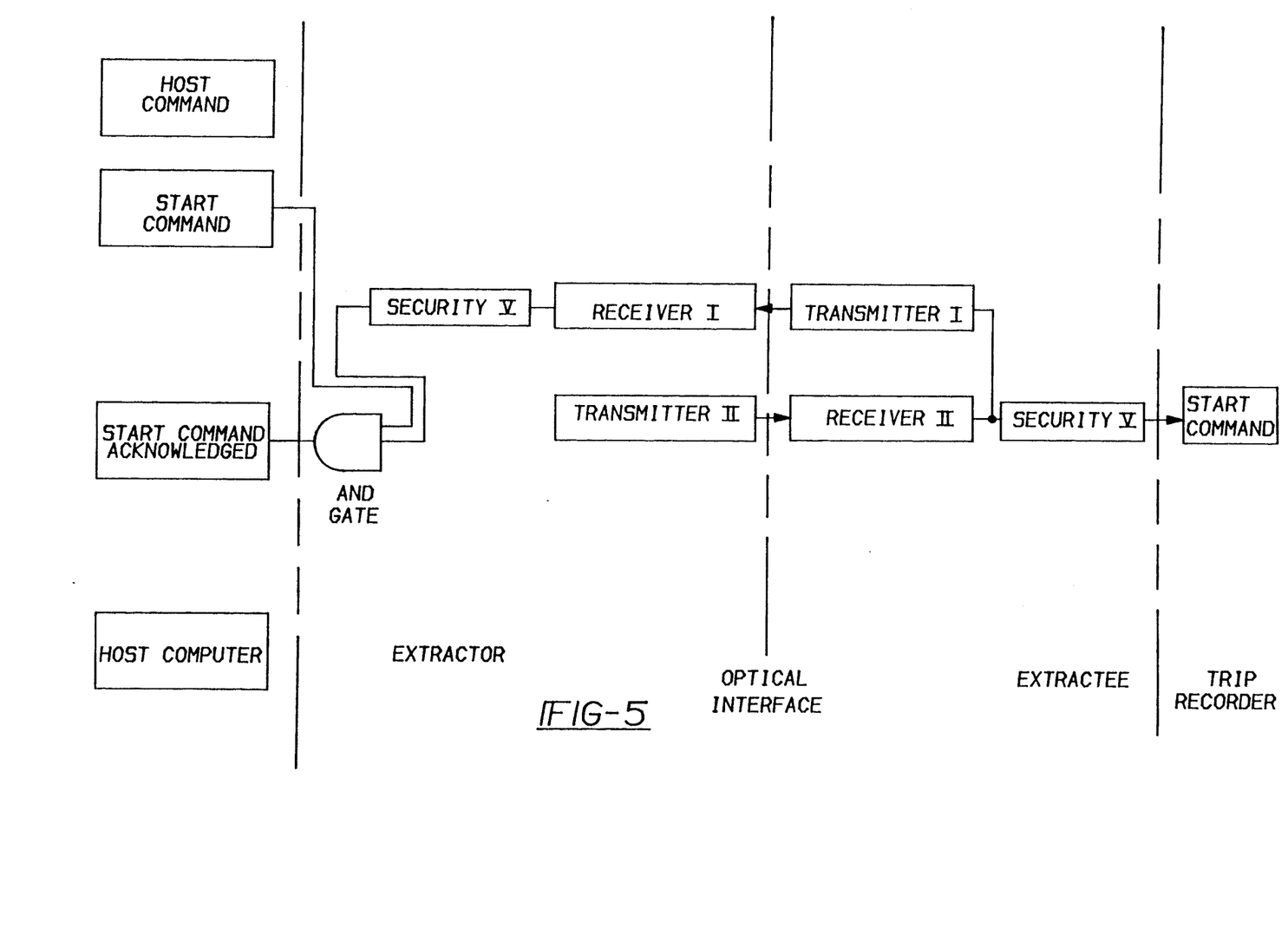
FIG. 5 is a flow diagram representation of the friend-foe recognition system.

In addition TRANSMITTER I rebroadcasts an identical fixed frequency infrared light signal which is received by RECEIVER I. If SECURITY VA discriminates the originally broadcasted signal from all signals incident upon RECEIVER I, Security VA will produce a logic TRUE acknowledging receipt of the echoed signal. If the host computer is ready to commence extraction, a logic TRUE will be supplied to the AND gate. The AND gate will produce a logic TRUE upon the coincidence of a logic TRUE from the host computer and a logic TRUE from SECURITY VA. The logic TRUE produced by the AND gate is then communicated to the host computer at which point data extraction may begin. Security V and VA provide identical functions which include filtering to discriminate and identify a friendly signal and then generate a logic TRUE or FALSE in response to the appropriate condition.

Data extraction is accomplished (as shown in schematic form in FIG. 6) by communicating trip recorder STORED DATA in TTL logic form to TRANSMITTER IV. TRANSMITTER IV produces a corresponding infrared light signal and broadcasts the signal to RECEIVER IV. RECEIVER IV receives the signal and produces a TTL logic signal therefrom and then communicates the signal to the TRIPFAX SOFTWARE DATA INPUT OF THE HOST COMPUTER.

Figure 6:
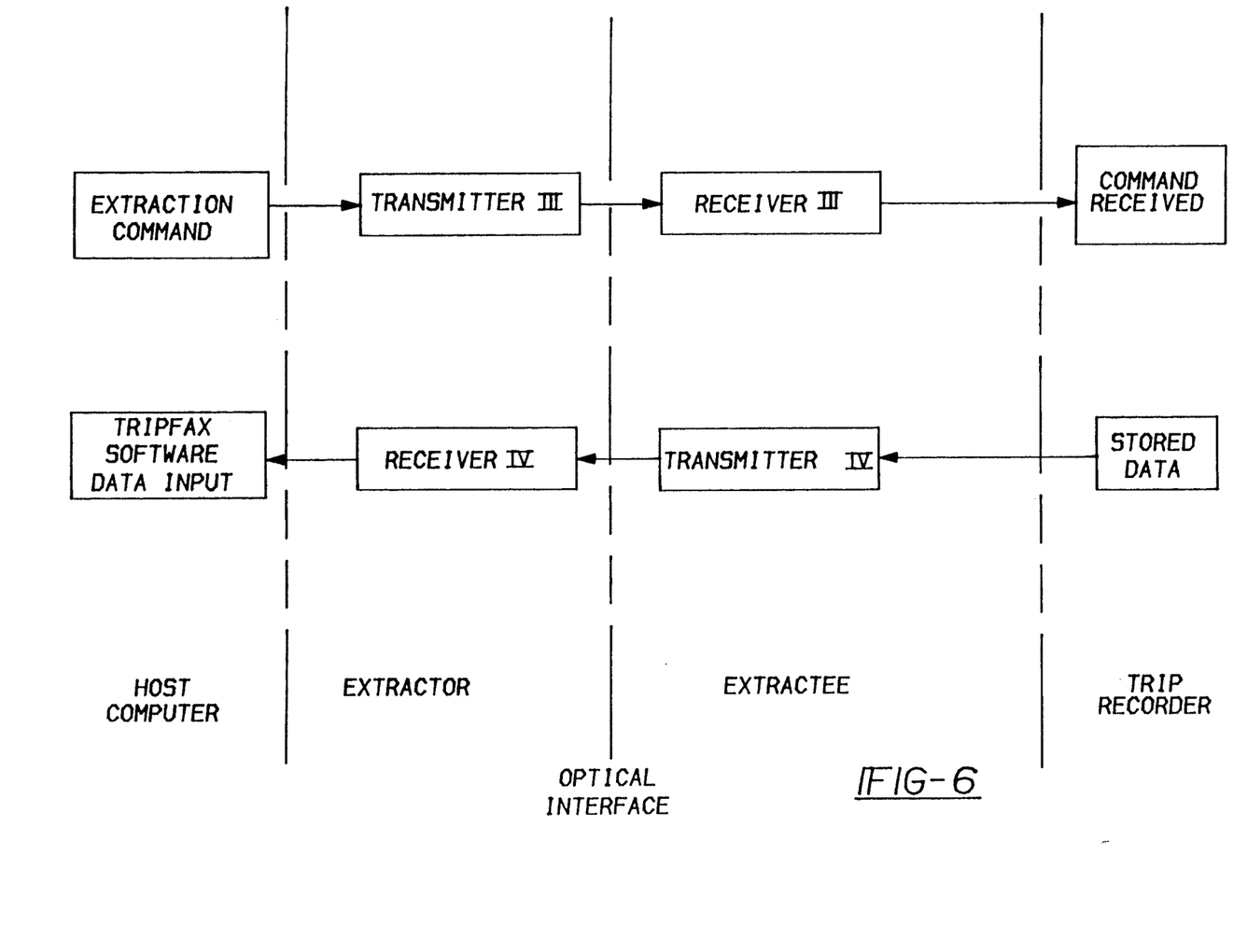
FIG. 6 is a flow diagram representation of the data exchange system.

The trip recorder begins the data extraction process upon receipt of a command from the host computer. The trip recorder receives the extraction command from the host computer via a communication link connecting the host and the trip recorder. This communication link is identical to the previously described communication link. That is, an EXTRACTION COMMAND from the host computer in TTL logic form is produced and broadcast as an infrared light signal by TRANSMITTER III. RECEIVER II receives the command and produces a TTL logic signal which is then communicated to the COMMAND RECEIVED of the trip recorder.

Figure 7A:
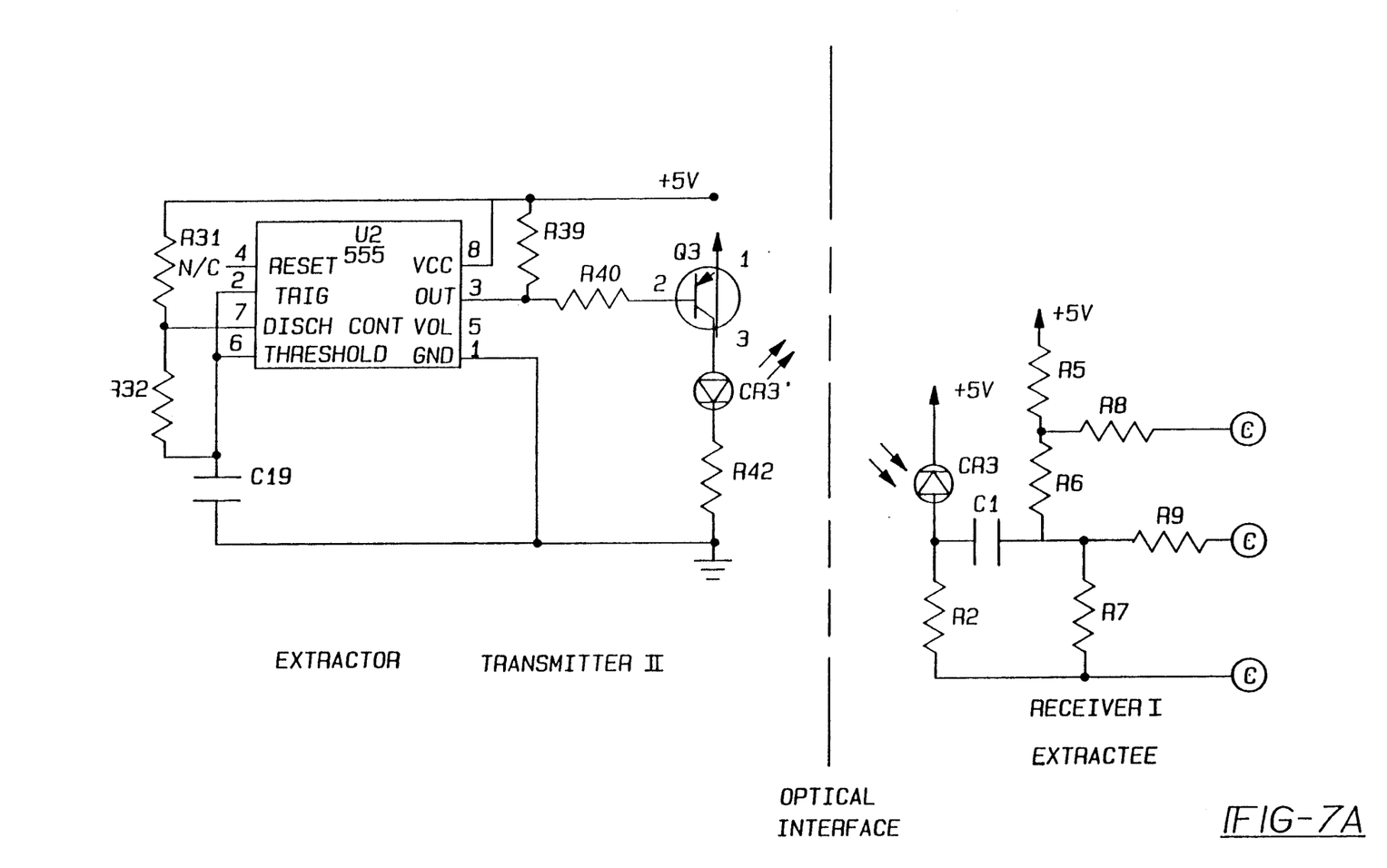
FIG. 7A and 7B are schematic diagrams of the first half of the friend-foe circuit.

A detailed implementation of the functional elements described herein is illustrated in FIG. 7A, 7B, 8A, 8B, 9A, 9B, 10A and 10B explained as follows: The first half of the friend-foe schematic is shown in FIG. 7A. A fixed frequency infrared light signal is continuously broadcasted by TRANSMITTER II. TRANSMITTER II includes an oscillator chip U2 which is preferably a 555 IC timer. Resistor R31 and R32 in conjunction with capacitor C19 establish the frequency at which oscillator U2 oscillates. The output of U2 is supplied to transistor Q3. The collector of Q3 is connected to the anode of infrared light emitting diode CR3'. In operation, the oscillator signal from U2 is supplied to the base of Q3 where is it amplified and then broadcasted as infrared light signal.

Figure 7B:
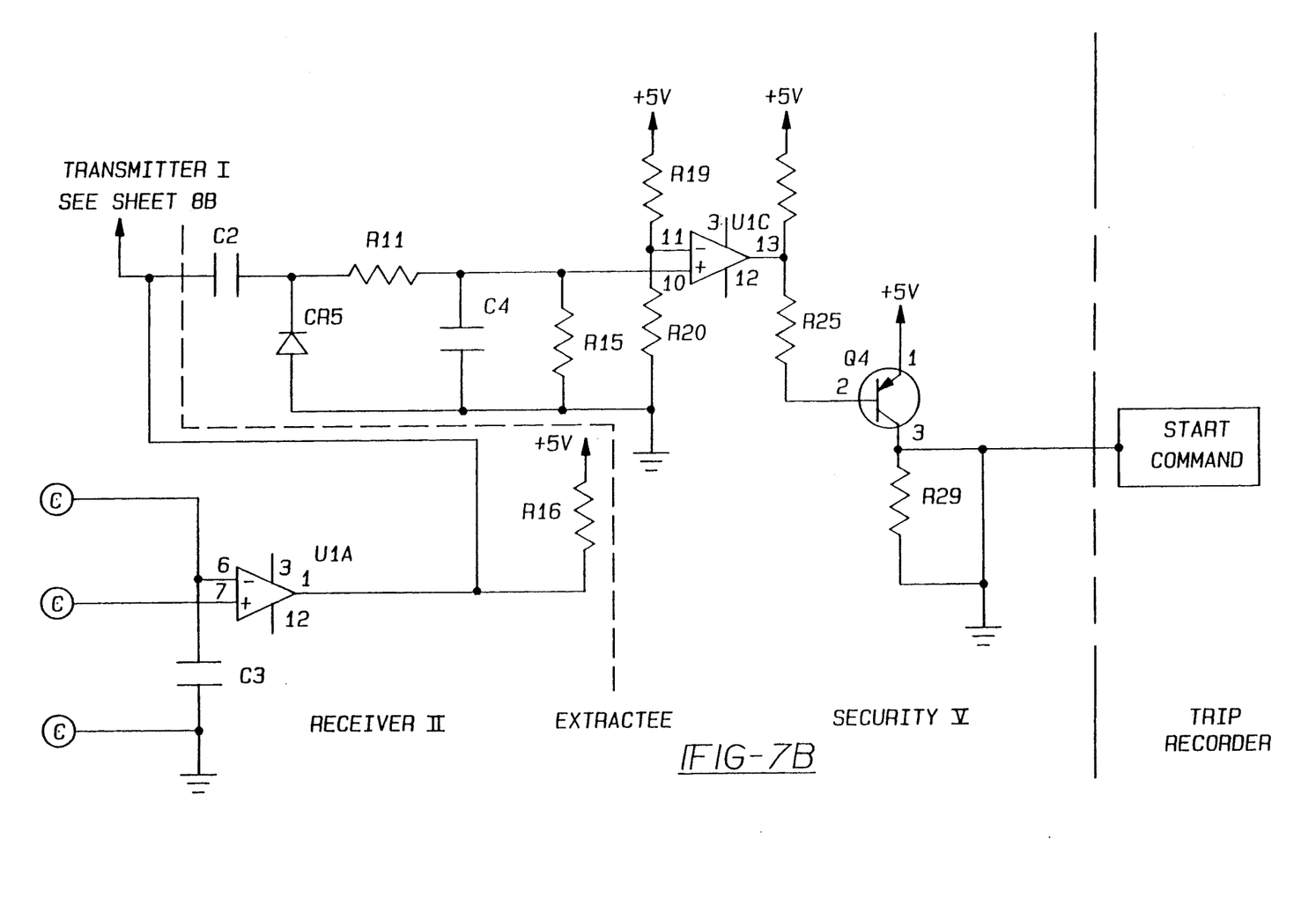

If the extractor 16 and extractee 18 are engaged and properly aligned, the infrared light signal emanating from TRANSMITTER II will strike CR3 of RECEIVER II. The infrared light signal is then converted to an electrical voltage signal which can be measured across resistor R2. The signal across R2 is AC coupled through capacitor C1 and provided to the voltage divider consisting of resistors R5, R6 and R7. Capacitor C3 as shown in FIG. 7B, provides a reference voltage to comparator U1A. The output of U1A is then supplied to TRANSMITTER I and SECURITY V. Components included within SECURITY V include capacitor C2, diode CR5, and resistor R11 which perform a half-wave rectifier function. Capacitor C4 and resistor R15 provide a filtering function. The half-wave rectifier, in combination with filtering, provide a band pass filter. Resistor R19 in combination with R20 provide a reference voltage to U1C. If a friendly signal is recognized, output of U1C will be amplified by Q4 as a logic TRUE. The logic TRUE is then communicated to the trip recorder 20 and serves as a START COMMAND.

Figure 8A:
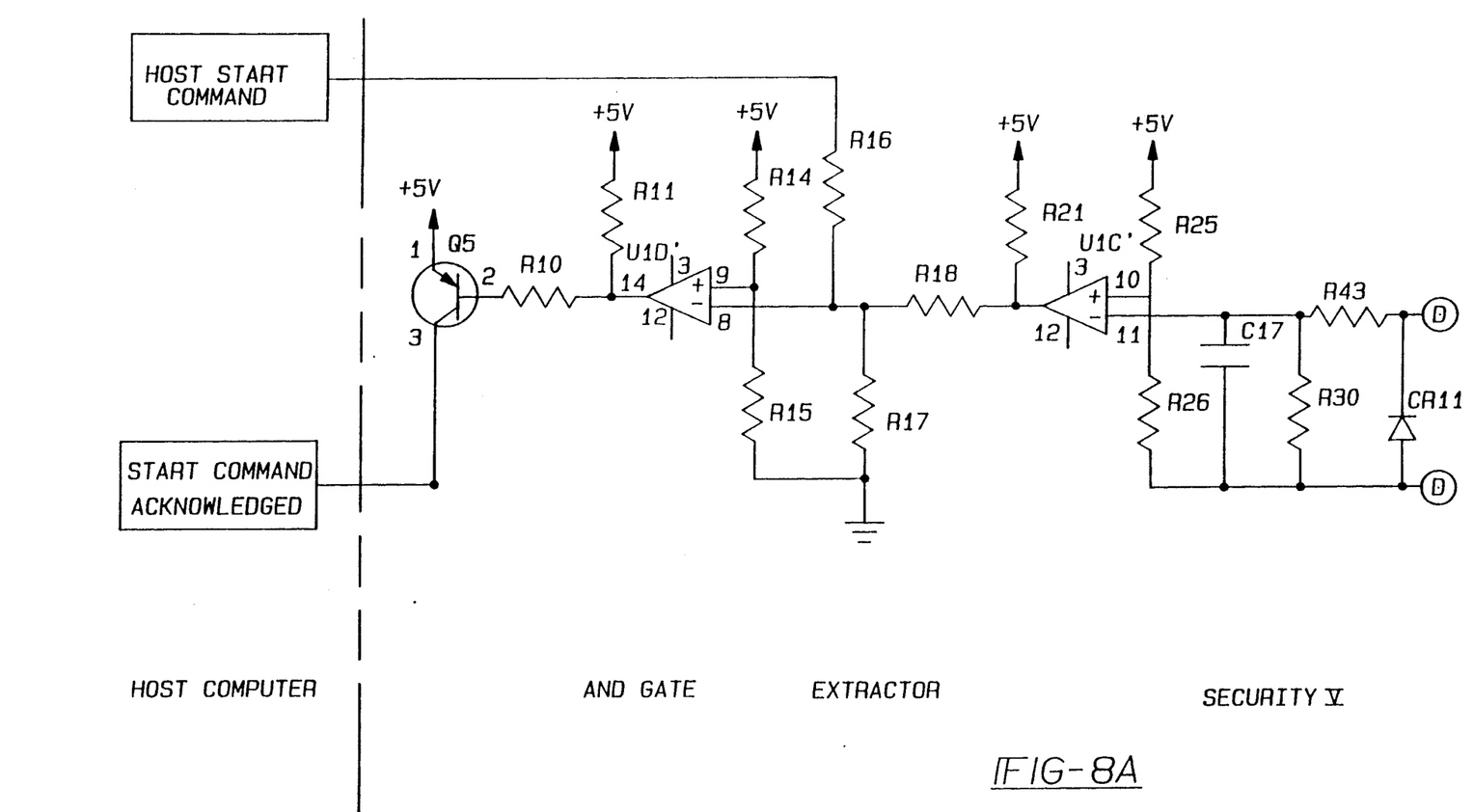
FIG. 8A and 8B are schematic diagrams of the second half of the friend-foe schematic.

The second half of the friend-foe schematic is shown in FIG. 8A. The output of U1A is supplied to Q1 of TRANSMITTER I. The collector of Q1 is connected to the cathode of infrared light emitting diode CR2. In this manner, CR2 broadcasts an infrared light signal which is identical to the signal received by CR3. CR2' of RECEIVER I receives the respective signal (broadcast by CR2) and converts the light signal to an electrical voltage across resistor R41.

The signal across R41 is AC coupled through capacitor C22. A voltage divider comprised of resistors R36, R37 and R38 produces a signal which is supplied to comparator U1A'. Capacitor C20 supplies a reference voltage to U1A'. The output of U1A' is then transmitted to security VA (shown in FIG. 8B). Components included within SECURITY VA include capacitor C18, diode CR11 and resistor R43 which perform a half-wave rectifier function. Capacitor C17 and resistor R30 provide a filtering function. The half-wave rectifier in combination with filtering provide a band pass filter. Resistor R26 in combination with R25 perform a voltage divider function which provides a reference voltage to U1C'. Resistor R16, R17 and R18 perform an AND gate function.

Figure 8B:
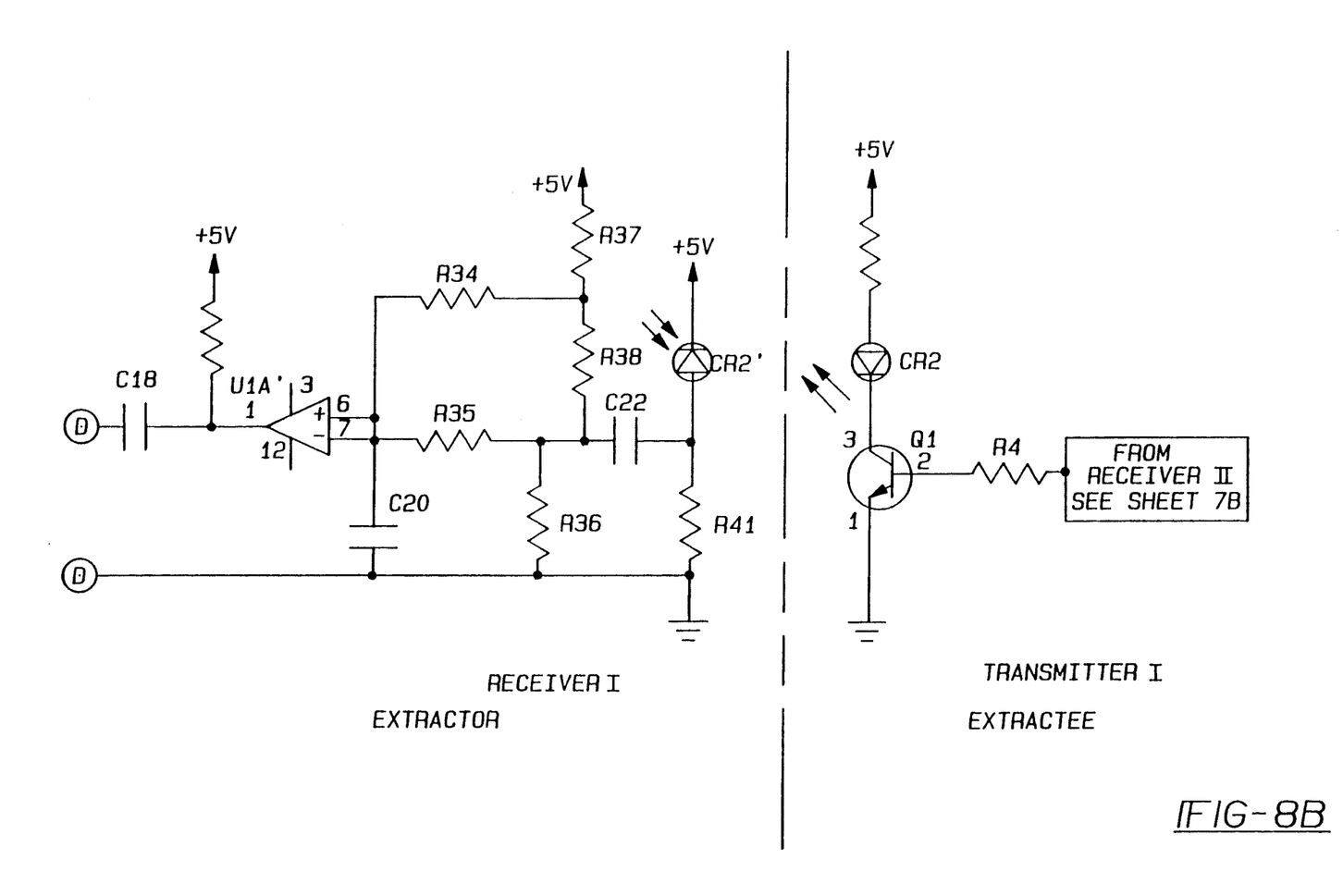

In operation, a light signal received by CR2' is amplified by U1A'. A signal having an appropriate frequency will pass the band pass filter as a friend and produce a voltage across C17 which will exceed the reference voltage provided to comparator U1C'. When this condition exists, U1C' produces a logic TRUE indicating a friend has been recognized. This signal is then supplied to the AND gate comprising R16, R17, R18 and U1D'. When U1C' output is a TRUE and the host START COMMAND is a logic TRUE, the AND gate will produce a logic TRUE. The logic TRUE is then supplied to transistor Q5. Transistor Q5 amplifies the logic TRUE to a signal level appropriate for communication to the host computer to acknowledge the START COMMAND and initiate the extraction process.

Figure 9A:
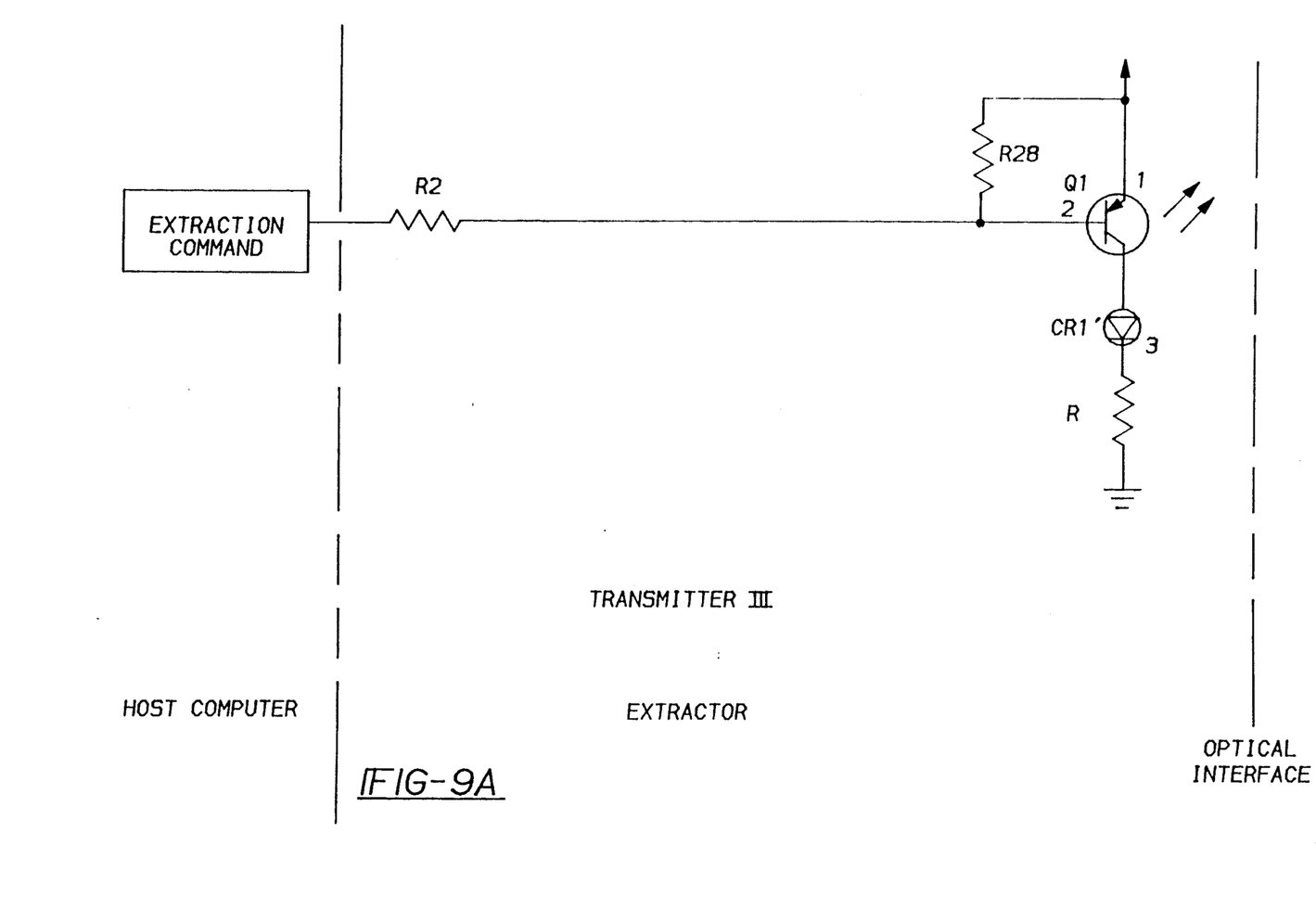
FIG. 9A and 9B are schematic diagrams of the first half of the full duplex data path.
Figure 9B:
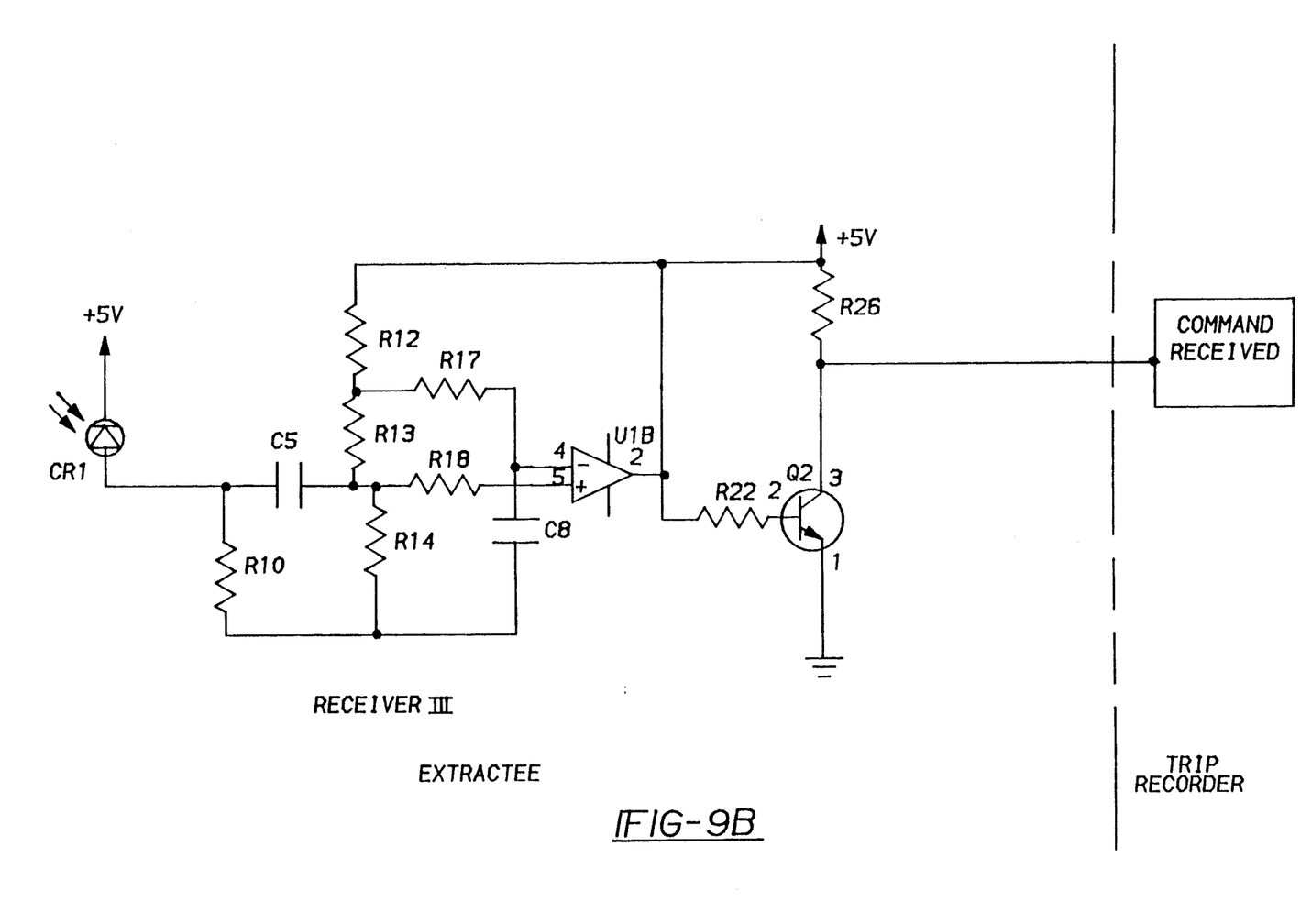

TRANSMITTER III is a portion of the communication link between the host computer and the trip recorder through which data extraction commands are transmitted. Commands received by TRANSMITTER III from the host computer are typically in the form of a TTL logic signal. This signal is provided to the base of transistor Q1 (as shown in FIG. 9A). The emitter of Q1 is connected to the anode of infrared light emitting diode CR1'. In this manner, TRANSMITTER III converts the TTL logic signal to an infrared light signal corresponding to the respective TTL logic signal. The infrared light signal is then broadcasted across the optical interface to RECEIVER III (as shown in FIG. 9B). Infrared photo diode CR1 receives the respective light signal and produces a voltage across resistor R10. Capacitor C5 provides AC coupling to the resistor divider network which includes resistors R12, R13 and R14. Capacitor C8 provides a voltage reference to U1B. Output of U1B is provided to the base of transistor Q2 through resistor R22. Transistor Q2 amplifies the signal to produce a TTL logic signal level appropriate for communication to the trip recorder.

Figure 10A:
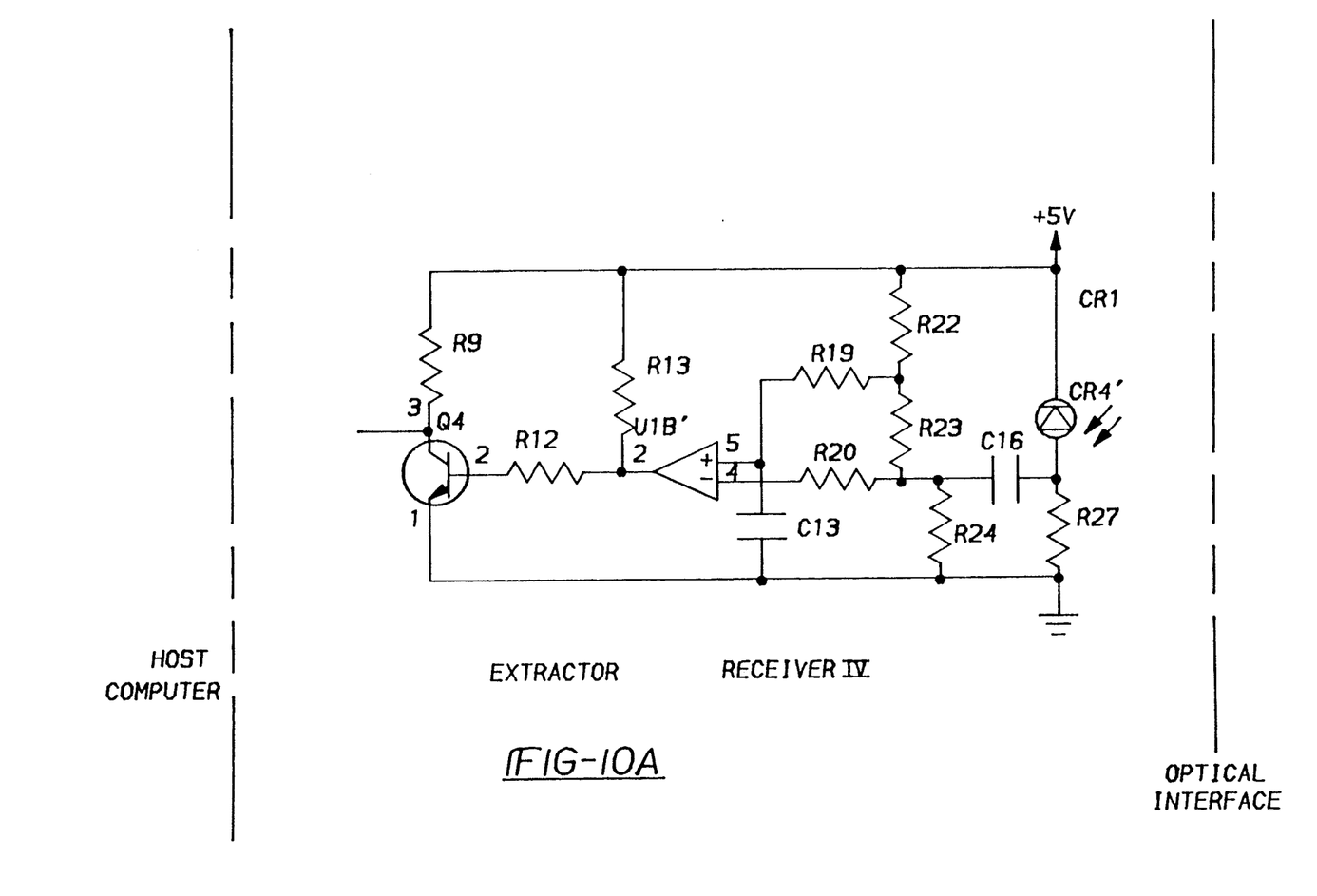
FIG. 10A and 10B are schematic diagrams of the second half of the full duplex data path.
Figure 10B:
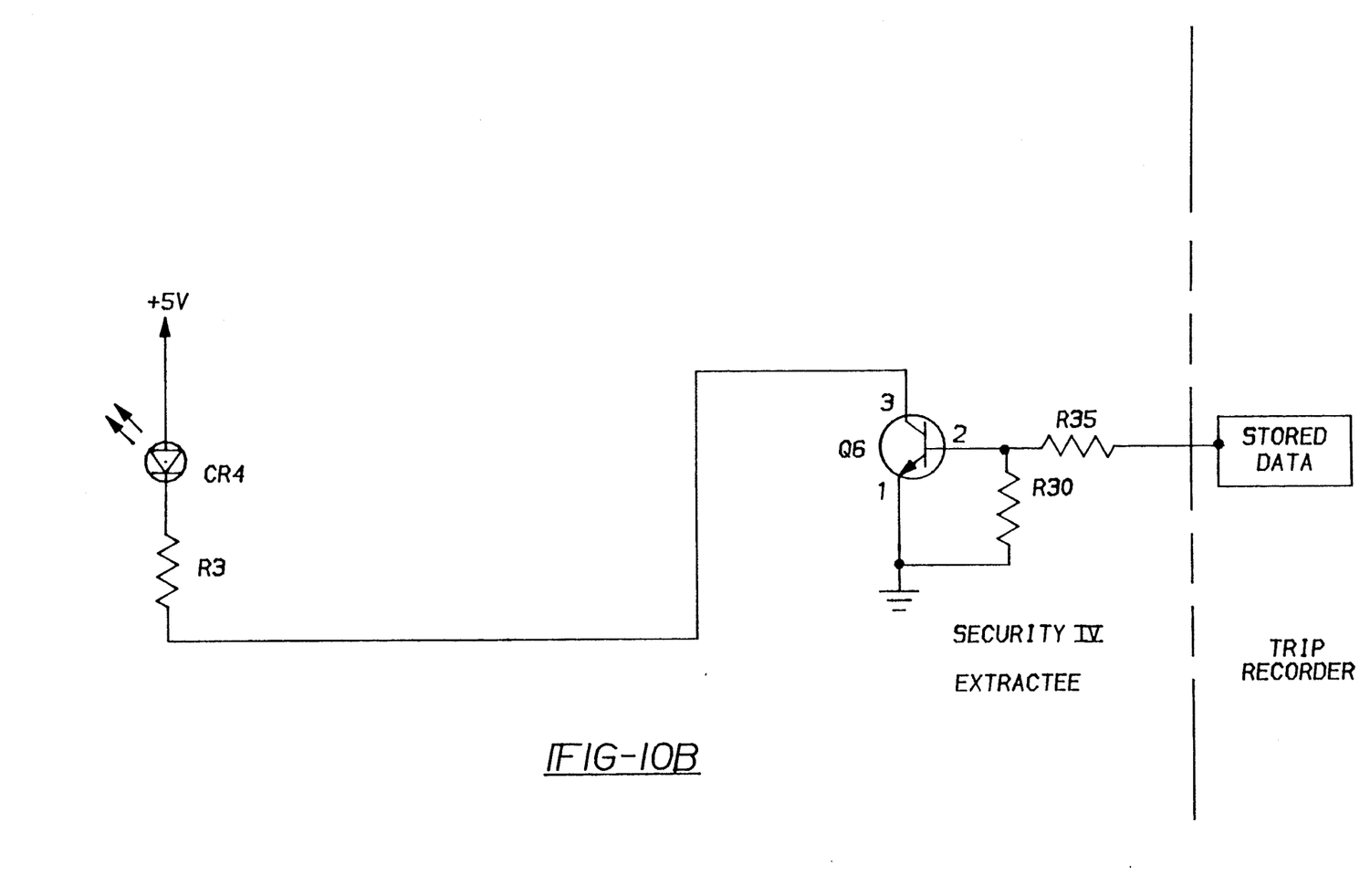

Data flowing from the trip recorder to the host computer is communicated to TRANSMITTER IV. TRANSMITTER IV receives a signal from the trip recorder in TTL logic form which is transmitted through resistor R35 to the base of transistor Q6 (as shown in FIG. 10A). The collector of Q6 is connected to the cathode of light emitting diode CR4. TRANSMITTER IV converts the TTL logic signal received from the trip recorder to an infrared light signal which is broadcast by CR4. This infrared light signal is received by a corresponding infrared photo diode CR4' of RECEIVER IV (as shown in FIG. 10B). A voltage signal is generated across resistor R27 which corresponds with the signal being received by CR4'. This voltage signal is then coupled through C16 and supplied to a voltage divider comprising resistors R22, R23 and R24. Capacitor C13 provides a reference voltage to U1B'. The output of comparator U1B' is supplied to the base of transistor Q4 through R12. The collector is connected to host computer. In this manner, an infrared light signal incident upon photo diode CR4' produces a TTL logic signal which is then communicated to the host computer.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. An optical interface for interconnecting the recorder data port of an on-board vehicle trip recorder to the host data port of a host computer, comprising:
   an extractor member having first connection means for attaching to said host computer;
   an extractee member having a second connection means for attaching to said trip recorder;
   said extractor and extractee members having means for nestably interfitting with one another;
   a means for establishing a bidirectional data path disposed on said extractor and extractee members;
   said means for establishing a bidirectional data path comprising first optical coupling means for alignment when extractor and extractee members are nestably interfitted to selectively couple and thereby define data communication between said recorder data port and said host data port;
   a friend/foe means comprising second optical coupling means disposed on said extractor and extractee members for alignment when extractor and extractee members are nestably interfitted to acknowledge the presence of a condition in which data communication between said recorder port and said host port is possible;
   said friend/foe means including a transmitting means for transmitting a first signal in a first direction and an echo means for transmitting a second signal in a second direction in response to said first signal;
   security means responsive to said friend/foe means for selectively enabling and disabling data communication between said recorder and host ports;
   said first and second optical coupling means having a predefined geometric relationship established at least in part by said extractor and extractee members whereby alignment of said first optical coupling means insures alignment of said second optical coupling means; and
   a break away member defined on at least one of said extractor and extractee members for providing a mechanical fuse between extractor and extractee members in the event of failure to disassociate said members from the nestably interfitted relationship before moving the vehicle.

2. The interface of claim 1 wherein said break away member is a breakable tab.

3. An optical interface for interconnecting the recorder data port on an on-board vehicle trip recorder to the data port of a host computer, comprising:
   a full duplex data path between said recorder data port and said host data port comprising a first optical transmit/receive pair for data communication in a first direction and a second optical transmit/receive pair for data communication in a second direction;
   said first and second optical coupling means disposed in a first predefined geometric relationship on physically couplable extractor and extractee means;
   a friend/foe means comprising a third optical transmit/receive pair for transmitting a quaere signal in a first direction and a fourth optical transmit/receive pair for transmitting an echoes signal in a second direction in response to said quaere signal;
   said third and said fourth optical coupling means disposed in a second predefined geometric relationship on said physically couplable extractor and extractee means;
   said first and second predefined geometric relationship having a predefined relationship whereby alignment of said third and fourth optical coupling means insures alignment of said second optical coupling means;
   said quaere signal comprising a substantially continuously transmitting fixed frequency continuous wave (CW) signal;
   said echoed signal comprising a signal having frequency equal to the frequency of said quaere signal;
   security means responsive to said friend/foe means for continuously selectively enabling and disabling data communication between said recorder and host ports;
   said couplable extractor and extractee members having means for nestably interfitting with one another which defines a physical interrelationship between said extractor and extractee which enable alignment of said first and second geometric relationships; and
   a breakaway member defined on at least one of said extractor and extractee members for providing a mechanical fuse between extractor and extractee members in the event of failure to disassociate said members from the nestably interfitted relationship before moving the vehicle.

4. The interface of claim 3 wherein said breakaway member is a breakable tab.

* * * * *